US011025633B2

(12) United States Patent
Judge et al.

(10) Patent No.: US 11,025,633 B2
(45) Date of Patent: Jun. 1, 2021

(54) SYSTEM AND METHOD FOR NETWORK ACCESS POINT INSTALLATION AND ACCESS CONTROL

(71) Applicant: BRK Brands, Inc., Aurora, IL (US)

(72) Inventors: Paul Qantas Judge, Atlanta, GA (US); Adam Wesley Allred, Decatur, GA (US); Michael Burkett Biggs, Alpharetta, GA (US); Daniel Jack Peck, Decatur, GA (US); Paul Harris Royal, Atlanta, GA (US)

(73) Assignee: BRK Brands, Inc., Aurora, IL (US)

( * ) Notice: Subject to any disclaimer, the term of this patent is extended or adjusted under 35 U.S.C. 154(b) by 11 days.

(21) Appl. No.: 16/550,898

(22) Filed: Aug. 26, 2019

(65) Prior Publication Data

US 2020/0059797 A1 Feb. 20, 2020

Related U.S. Application Data

(63) Continuation of application No. 15/624,678, filed on Jun. 15, 2017, now Pat. No. 10,397,800.
(Continued)

(51) Int. Cl.
*H04L 29/06* (2006.01)
*H04W 16/20* (2009.01)
*H04L 12/24* (2006.01)
*H04W 12/08* (2021.01)
*H04W 4/33* (2018.01)
(Continued)

(52) U.S. Cl.
CPC .......... *H04L 63/101* (2013.01); *H04L 41/145* (2013.01); *H04L 41/22* (2013.01); *H04L 63/107* (2013.01); *H04W 4/33* (2018.02); *H04W 12/06* (2013.01); *H04W 12/08* (2013.01); *H04W 16/20* (2013.01); *H04W 24/02* (2013.01); *G06F 3/0481* (2013.01); *H04L 63/0876* (2013.01); *H04W 84/10* (2013.01)

(58) Field of Classification Search
CPC ....... H04W 16/20; H04W 4/33; H04W 12/08; H04W 24/02; H04W 24/06; H04L 41/145; H04L 41/22; H04L 63/101; H04L 63/107; H04L 63/0876; G06F 3/0481
See application file for complete search history.

(56) References Cited

U.S. PATENT DOCUMENTS 7,295,119 B2    11/2007  Rappaport et al.
7,295,960 B2 *  11/2007  Rappaport ............. H04L 43/00
                                                703/13
(Continued)

*Primary Examiner* — Hosuk Song
(74) *Attorney, Agent, or Firm* — Meunier Carlin & Curfman LLC

(57) ABSTRACT

Disclosed herein are systems and methods configured to provide customized and guided instructions for the placement of multiple access points in a home envelope to optimize-coverage therein. The exemplified system and method facilitates the learning of the home envelope, the determining of placements of devices within different locations within the home envelope, and the guiding of the homeowner or occupant through the installation process of the devices at such placements. The provided information are customized and tailored for a given home envelope. In addition, the exemplified systems and methods simplifies the task of adding personal wireless devices to a network whereby no password is used.

20 Claims, 13 Drawing Sheets

Related U.S. Application Data

(60) Provisional application No. 62/350,680, filed on Jun. 15, 2016.

(51) Int. Cl.
*H04W 12/06* (2021.01)
*H04W 24/02* (2009.01)
*H04W 84/10* (2009.01)
*G06F 3/0481* (2013.01)

(56) References Cited

U.S. PATENT DOCUMENTS

| | | |
|---|---|---|
| 7,539,495 B2 | 5/2009 | Kalika et al. |
| 8,019,352 B2 * | 9/2011 | Rappaport ............ H04W 64/00 455/456.1 |
| 8,175,608 B2 * | 5/2012 | Kalika ................ H04W 8/005 455/446 |
| 8,577,381 B2 | 11/2013 | Kalika et al. |
| 9,066,224 B2 | 6/2015 | Schwengler |
| 9,288,844 B1 | 3/2016 | Akhavan-Saraf et al. |
| 9,668,146 B2 | 5/2017 | Lau et al. |
| 9,706,499 B2 * | 7/2017 | Pike .................... H04B 17/318 |
| 10,397,800 B2 * | 8/2019 | Judge .................. H04W 12/06 |

\* cited by examiner

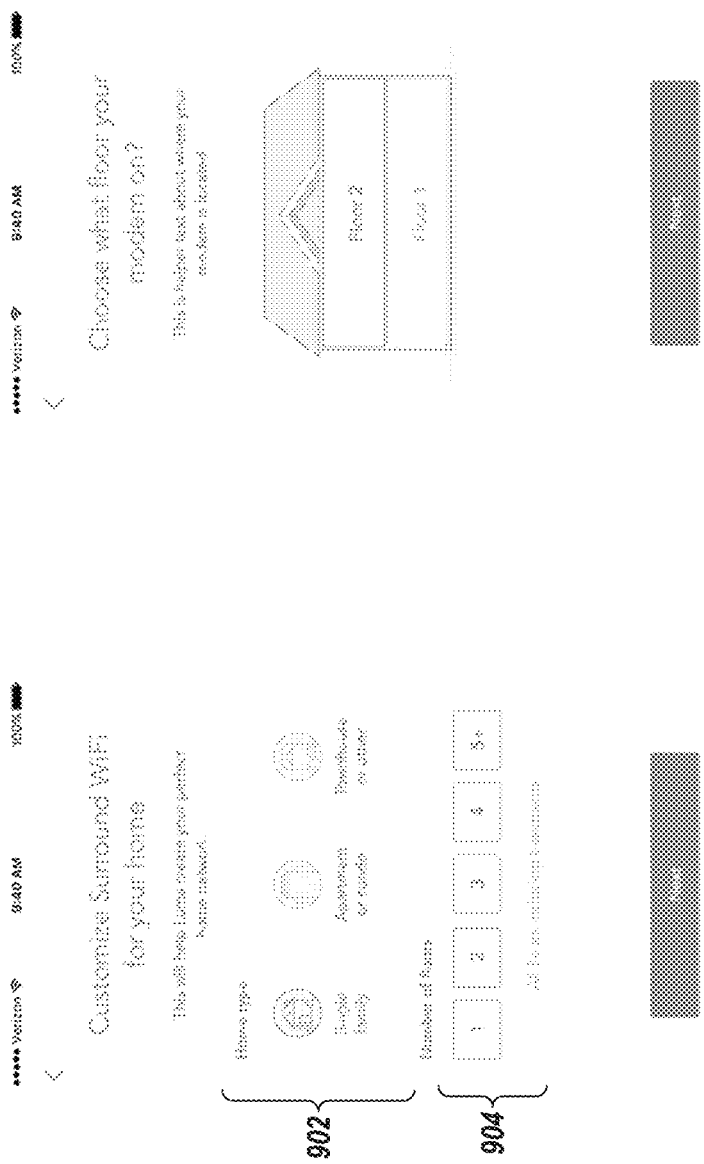

SYSTEM AND METHOD FOR NETWORK ACCESS POINT INSTALLATION AND ACCESS CONTROL

RELATED APPLICATIONS

This is a continuation application of U.S. application Ser. No. 15/624,678, filed Jun. 15, 2017, now U.S. Pat. No. 10,397,800, which claims priority to, and the benefit of, U.S. Provisional Appl. No. 62/350,680, filed Jun. 15, 2016, each of which is incorporated by reference herein in its entirety.

BACKGROUND

Installation of network devices in the home is, for the most part, a manual and "do-it-yourself" process. Homeowners or occupants receive general instructions, from device manufacturers, on placement of the manufacturer's devices within a given residential envelope. However, getting network coverage to every corner of the home can be a challenging task. Though there are numerous sources of published information on the Internet on how to configure a network, the task is still very complicated for most consumers because of the number of variables around the number of devices and the layout of the home.

One class of devices allows network professionals and technicians to measure broadcast signal strength emitted by given network device. However, such device merely confirms that the connectivity has reached a particular location in the building. For the home owner or occupant to install multiple network devices in a home, he or she would have to research the information or rely on a professional installer.

Subsequent to installing network devices, the homeowner or occupant is then tasked with the laborious chore of securing the network by adding personal wireless devices to the network using a password for the network device.

What are needed are devices, systems and methods that overcome challenges in the present art, some of which are described above.

SUMMARY

Disclosed herein are systems and methods configured to provide customized and guided instructions for the placement of multiple access points in a home envelope to optimize-coverage therein. The exemplified system and method facilitates learning of the home envelope, determining of placements of devices within different locations within the home envelope, and guiding of the homeowner or occupant through the installation process of the devices at such placements. The provided information are customized and tailored for a given home envelope.

In some embodiments, the exemplified system and method provides an intuitive and user-centric graphical user interface configured to prompt the user (e.g., owner of the network) to i) provide information about the home envelope and/or ii) verify information automatically retrieved of the home envelope from public and/or private databases based on the address of the home envelope. In some embodiments, the network device includes a location identification system (e.g., a global-positioning receiver or MPS) that provides location information of the network device that is used to determine an address of the location and public/private sources of information about the home based on the address. The home envelope information is used in conjunction with known connectivity information associated with a network device to populate, in a graphical user interface, a customized map of the home envelope and a respective location of plurality of network device therein. To this end, the homeowner or occupant has a detailed set of installation instructions tailored and customized to the home envelope and the number of access points.

In addition, the exemplified systems and methods simplifies the task of adding personal wireless devices to a network whereby no password is used. Rather, one or more of the installed network device is configured to receive a request from a wireless computing device (or wired device) associated with a guest or a new user to join the network of the installed network device and to transmit an authentication request message directly, or indirectly via a cloud-service platform, to a computing device associated with the homeowner or the home occupant. The homeowner or the home occupant can accept or deny access of the guest or the new user via an application or a portal executing or accessible via their computing device, which transmits an authentication request message back to the requesting network device or back to the cloud-service platform to add, if permission is granted, an identifier associated with the requesting wireless computing device (or requesting wired device) to the list of authenticated device in the network. In some embodiments, the graphical user interface, when presenting the accept or deny prompt on the owner/occupant computing device, provides options associated with the access, e.g., a duration of access, an access level or class, or the addition of the requesting device of a list of banned devices.

In some embodiments, the exemplified systems and methods simplify the task of adding a user-owned device (e.g., a smart TV, IoT device, and the like), to a network without using a password. In some embodiments, as a user-owned device joins a first network (a temporary or authentication network) through a SSID (e.g., an auto-join SSID) known for this purpose, the network/administrator is prompted to allow/disallow the device onto the network. After receiving authorization, the requesting device is securely directed to join and access a second network that is the real network.

In an aspect, a method is disclosed of customizing installation and placement of wireless access point placement in a building. The method includes receiving, at one or more owner device or a device being access using an owner's account), a request to configure and install a plurality of wireless access point device in a building, the plurality of wireless access point comprising a first wireless access point and a second wireless access point; accessing, at the one or more first computing devices, a location identifier associated (e.g., GPS coordinates from a global positioning receiver or mobile positioning receiver located in one of the plurality of wireless access point device) with the first wireless access point (e.g., a base wireless access point); retrieving, at the one or more first computing devices, i) a building address associated with the location identifier and ii) building layout data from Realty Trac and/or Google Maps API) associated with the building address and causing a layout description (e.g., a type of building and a number of floors) derived from the building layout data and the retrieved building address to be presented on the second computing device; determining, at the one or more first computing devices, using the building layout data, a first location for the first wireless access point and a second location or the second wireless access point; and causing, at the one or more first computing devices, the first location and second location to be presented at the second computing devices at a graphical user interface of, a graphical representation of a map of the wherein the first location and second location each denotes a floor location and an area location (e.g., room location) on each respective floor location.

In some embodiments, the map of the building comprises a representation of a floor plan of the building.

In some embodiments, the map of the building comprises a diagram of a floor plan, the diagram comprising a plurality of areas, the plurality of areas having a number of areas selected from the group consisting of 1, 2, 3, 4, 6, 7, 8, 9, 10, 11, 12, 13, 14, 15, 16, 17, 18, 19, and 20.

In some embodiments, the first location and second location are determined by a transfer function that includes variables including a size of the building; a number of floors; a number of access points; a construction type of the building; and an access point type (e.g., 5 GHz or 2.4 GHz).

In some embodiments, the building layout data includes a building type selected from the group consisting of a single family home, an apartment, and a townhouse.

In some embodiments, the building layout data includes a number of floors and a number of home size (e.g., in square feet).

In another aspect, a method is disclosed of customizing installation and placement of wireless access point placement a building. The method includes presenting, via a graphical user interface, a plurality of widgets to determine layout of a building and a plurality of access points to be installed therein, including a first widget, a second widget, a third widget, and a fourth widget, wherein the first widget is associated with a number of access points to be installed at a building, wherein the second widget is associated with a construction type of the building; wherein the third widget is associated with a number of floors; and wherein the fourth widget is associated with a size of the building (e.g., in square feet), wherein data associated with the first, second, third, and fourth widgets are used to calculated, for each access point, a placement location and a floor location in the building. The method further includes presenting, via a graphical user interface, a graphical representation including a fifth widget associated with a map of the building and one or more sixth widgets each superimposed over the fifth widget at a location corresponding to the calculated placement location.

In some embodiments, each of the one or more six widgets has a color value associated with a generated color on a given wireless access point.

In some embodiments, the method further includes presenting, via the graphical user interface, a ninth widget associated with a hypothetical address of the building, the hypothetical address being determined based on GPS or MPS data retrieved from the given wireless access point.

In another aspect, a method is disclosed of operating a network access point device to add a computing device to a secured network without using a password. The method includes receiving, at a first computing device an access point), from a second computing device (e.g., a user wireless device), a broadcasted request a user request or a guest request) to join the second computing device to a network, the broadcasted request comprising a device identifier and a physical address (e.g., MAC ID) associated therewith; adding, at the first computing device, the device identifier associated with the second computing device to a list of restrictive devices (e.g., maintained by the first computing device or a computing device operatively coupled to the first computing device), wherein the list of restrictive devices is used to grant the second computing device partial access (e.g., access to a cloud-service platform for higher level of authentication) to communicate with the first computing device; in response to receiving a network request HTTP-based request, HTTPS based request, SNMP request, TCP/IP based request, and the like) associated with the device identifier to fetch files from a web server, delivering, at the first computing device, to the second computing device, an authentication file (e.g., data or script), the authentication file having instructions, wherein when parsed or executed by the second computing device, cause the second computing device to present, at a display associated with the second computing device, a prompt for a user identity identifier; in response to receiving the user identity identifier from the second computing device, transferring, at the first computing device, the user identity identifier to a cloud service platform, wherein the cloud service platform is configured to cause the user identity identifier to be presented, at a display, of a third computing device associated with an owner of the network and to be prompted for a selection to provide access of the second computing device to the network; and in response to receiving a command from the cloud service platform, the command being associated with granted access of the second computing device, adding, at the first computing device, the physical address associated with the second computing device to a list of accessed devices (e.g., wherein the devices listed in the list of accessed devices are permitted to access network resources through the first computing device).

In some embodiments, the list of accessed devices is a guest list.

In some embodiments, the list of accessed devices is a user list.

In some embodiments, the method includes receiving, at the first computing device, a second command to remove the physical address associated with the second computing device from the list of accessed devices, the second command being sent in response to an expiration of a access time allowance (e.g., for the guest device).

In some embodiments, the list of accessed devices is one of plurality of lists each having an associated set of one or more network devices (e.g., computers in the network, printers, scanners, storage devices).

In some embodiments, prior to transmitting the cloud service platform to cause the user identity identifier to be presented to the third computing device associated with the owner of the network, the cloud service platform is configured to i) retrieve a social network identifier corresponding to the user identity identifier ii) retrieve a list of associated social network identifier associated with the owner of the network and iii) transmit the command associated with the granted access of the second computing device to the first computing device upon a match of the retrieved social network identifier being present in the retrieved list of associated social network identifier associated with the owner of the network.

In some embodiments, the command associated with the granted access is transmitted automatically without any input from the owner of the network.

In some embodiments, the owner of the network is prompted for the command associated with the granted access.

In another aspect, a method is disclosed of managing (e.g., via cloud service platform) a network access point device to add a computing device to a secured network without using a password, the method comprising: in response to receiving, from a first computing device, at one or more second computing devices, a first request to add a user computing device (e.g., as a user device or a guest device) to a network associated with the first computing device, transmitting, at one or more second computing devices, a second request to a third computing device associated with an owner of the network, wherein the second request causes the third computing device to present, in a graphical user interface, a prompt comprising a widget to accept or deny access of the user computing device to the network, wherein the user computing device is listed in a list of restrictive devices that allows the device listed therein to communicate with the one or more second computing devices through the network; in response to receiving an accept message from the third computing device, transmitting, at the one or more second computing devices, the accept message to the first computing device, wherein the accept message causes the first computing device to add the user computing device to i) a first list of user devices that allows the device listed therein to communicate via an open Internet port associated with the first computing device and/or ii) a second list of users devices that allows the devices listed therein to communicate with the one or more computing devices and/or resources associated with the network; and in response to receiving a deny message from the third computing device, transmitting, at the one or more second computing devices, the deny message to the first computing device, wherein the deny message causes the first computing device to add the user computing device to i) a third list of user devices that prohibit the device listed therein from communicating via the open Internet port or with the one or more computing devices and/or resources associated with the network.

In some embodiments, the first request comprises a user identity identifier associated with the user computing device, the method comprising: in response to the first request, i) retrieving one or more social media identifier corresponding to the user identity identifier and ii) retrieving a list of associated social network identifier associated with the owner of the network; and transmitting the command associated with the granted access of the second computing device to the first computing device upon a match of the retrieved social network identifier (e.g., Facebook user ID) being present in the retrieved list (e.g., Facebook friend list) of associated social network identifier associated with the owner of the network.

In some embodiments, the first request comprises a name identifier a person's name).

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIGS. 9-10 illustrate example user interfaces associated with the operational flow of FIG. 3, in accordance with an embodiment.

DETAILED DESCRIPTION

Figure 1:
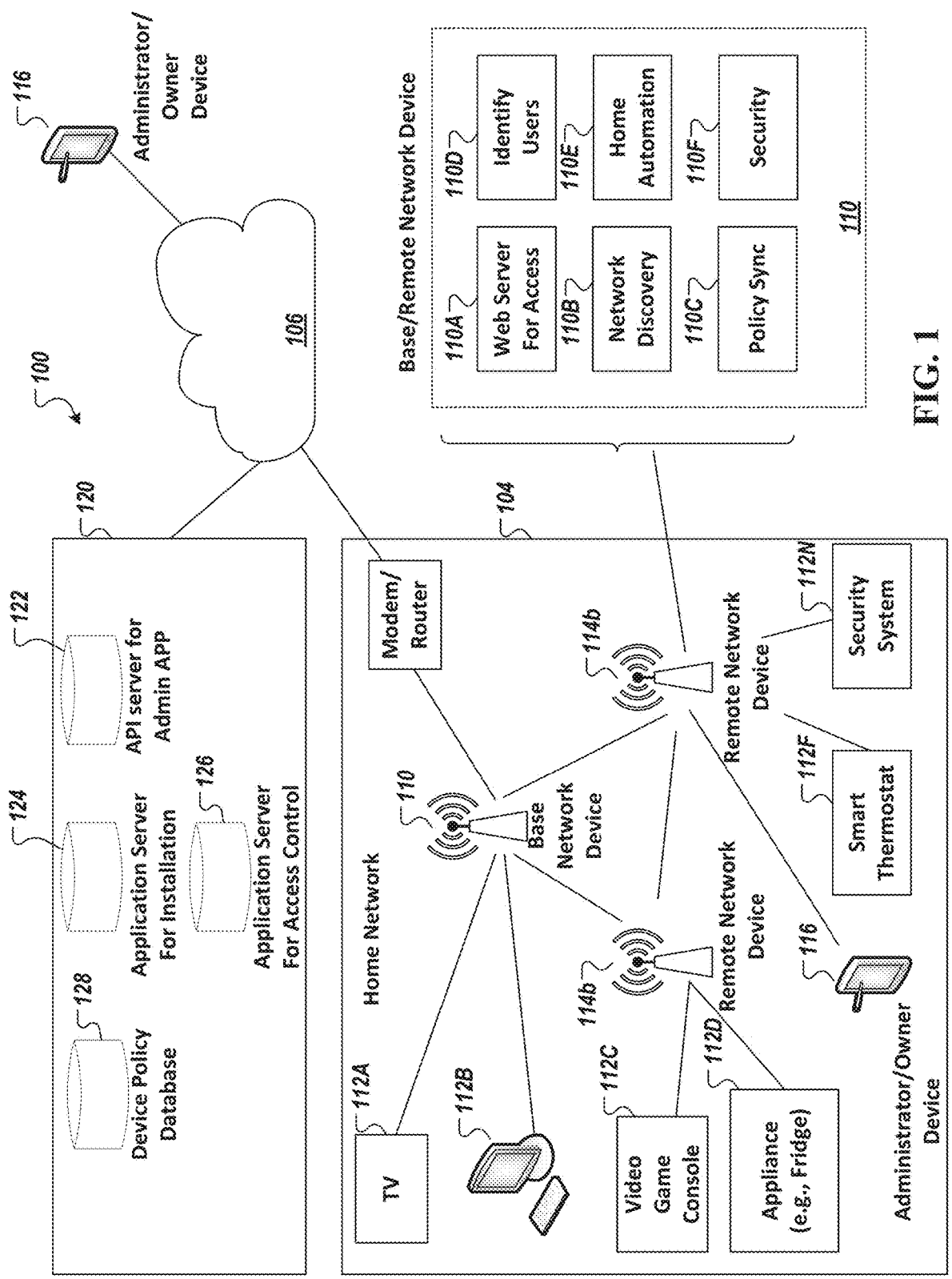
FIG. 1 illustrates an example environment in which the present disclosure may be implemented, in accordance with an embodiment.

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for providing an intuitive and user-centric graphical user interface and services to provide access to a home network, it will become evident to those skilled in the art that the implementations are not limited thereto.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of and is not intended to convey an indication of a preferred or ideal embodiment. Such as" is not used in a restrictive sense, but for explanatory purposes.

It is understood that throughout this specification the identifiers "first", "second", "third", "fourth", "fifth", "sixth", and such, are used solely to aid in distinguishing the various components and steps of the disclosed subject matter. The identifiers "first", "second", "third", "fourth", "fifth", "sixth", and such, are not intended to imply any particular order, sequence, amount, preference, or importance to the components or steps modified by these terms.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Overview

The subject matter of the present disclosure is directed to systems and methods to install and to configure network devices within in a home or other networks. A base wireless/wired network device is connected, for example, to a high-speed cable/fiber optic modem/router and provides wireless connectivity to computing devices within its proximity. A set of remote network devices connects to the base network device and extends the coverage of the modem and base network device. In some embodiments, the set of remote network devices are configured as a wireless mesh network. The base network device communicates, through the cable modem, with a cloud service platform, which x cites a management application of the home network and the base and remote network devices.

The management application is configured to provide building and home customization of placement of the base network device and remote network devices. The management application is configured to generate a customized home WiFi Map to guide the home owner in installing the base network device and remote network devices in the building that optimizes network coverage and connectivity of the devices in the building. In some embodiments, the management application operates in conjunction with the base network device and/or remote network devices (using hardware therein) to retrieved information to learn about the home. The management application can calculate customized placement of the base network device and/or remote network devices using the device provided information and public or private information of the home that can be retrieved from the Internet. The management application then generates the customized home WiFi Map to guide the home owner in installing the base network device and remote network devices in the building.

The WiFi Map shows the status of the network. One representation of the network is a 2d/3D diagram that shows the levels of the home, the placement of the base network device and/or remote network devices and the WiFi strength in multiple areas of the home as a heat map. This WiFi strength can be measured by a mobile application executing on the owner's mobile device or by collecting information from the different devices that are connected to the WiFi access points. The positions base network device and/or remote network devices can be determined based on the input from the user and/or by direct observations of the running network.

Example of the management application is described in U.S. application Ser. No. 15/133,269, published as U.S. Publication no, 2016/0308875, which is incorporated by reference herein in its entirety. The management application may also provide security features in the home. The security management application may learn about the people and devices who use the network. The security management application may determine what devices are on the network, what they are doing, and if visitors or unknown devices are attempting to gain access to the network. The security management application may provide for content filtering using, e.g., a slider, to set a maturity level such as G, PG, PG-13 and None. The security management application may operate with a security management device that enforces filtering polices across all devices, websites, and apps. In some implementations, the content filter is enforced on devices, such as smartphones and other handheld devices that are used off the network outside the home. The security management device may also enforce quiet hours, where Internet access is shut-off after a certain time. During operation, the security management device continuously scans all of the devices on the network for viruses and security risks, this includes, but is not limited IoT devices, such as smart TVs, thermostats, locks, as well as smart-phones, computers and laptops. The security management device also provides for performance monitoring, as it automatically monitors the performance of the network to detect delays or slowdowns. Because the security management device is targeted, but not limited to, home networks, an easy installation method provided. For example, a user may simple plug the device into a power outlet and follow prompting to join it the home Wi-Fi network. The security management device automatically discovers all of the other devices and learns about the network's users. After the discovery and learning, the device automatically protects the users and devices, even if they are out of the house, for example using a mobile app. The security management device interacts with a provider infrastructure to create reports and alerts that give a real-time visibility into everything that is on the network at any time.

Example Environment

With reference to FIG. 1, there is illustrated an example environment 100 in which the present disclosure may be implemented. Within the environment 100 a home network 104 that includes a base wireless network device 110 (e.g., an access point/router), devices 112A, 112B, 1120, 112D, 112E, 112F . . . 112N, and one or more remote wireless access points/routers 114 (shown as 114a and 114b). The base wireless network device 110 forms a mesh network with the wireless access points/routers 114. The devices 112A, 112B, 112C, 112D, 112E, 112F, . . . 112N may be any device, such as notebook and desktop computers, hand-held gaming devices, gaming consoles, smartphones, IoT devices, home automation devices, smart/connected appliances (e.g., smart thermostats, refrigerators, TVs), security system, and the like. The base wireless network device 110 may be two separate devices that respectively provide wireless access to the home network 104 and routing of communication traffic. The home network 104 may be one or more of an Internet Protocol (IP) based network (e.g., 802.11), Z-wave, Bluetooth, Zigbee, or other. The home network 104 is communicatively connected to the Internet 106 or other wide-area network infrastructure.

Figure 19:
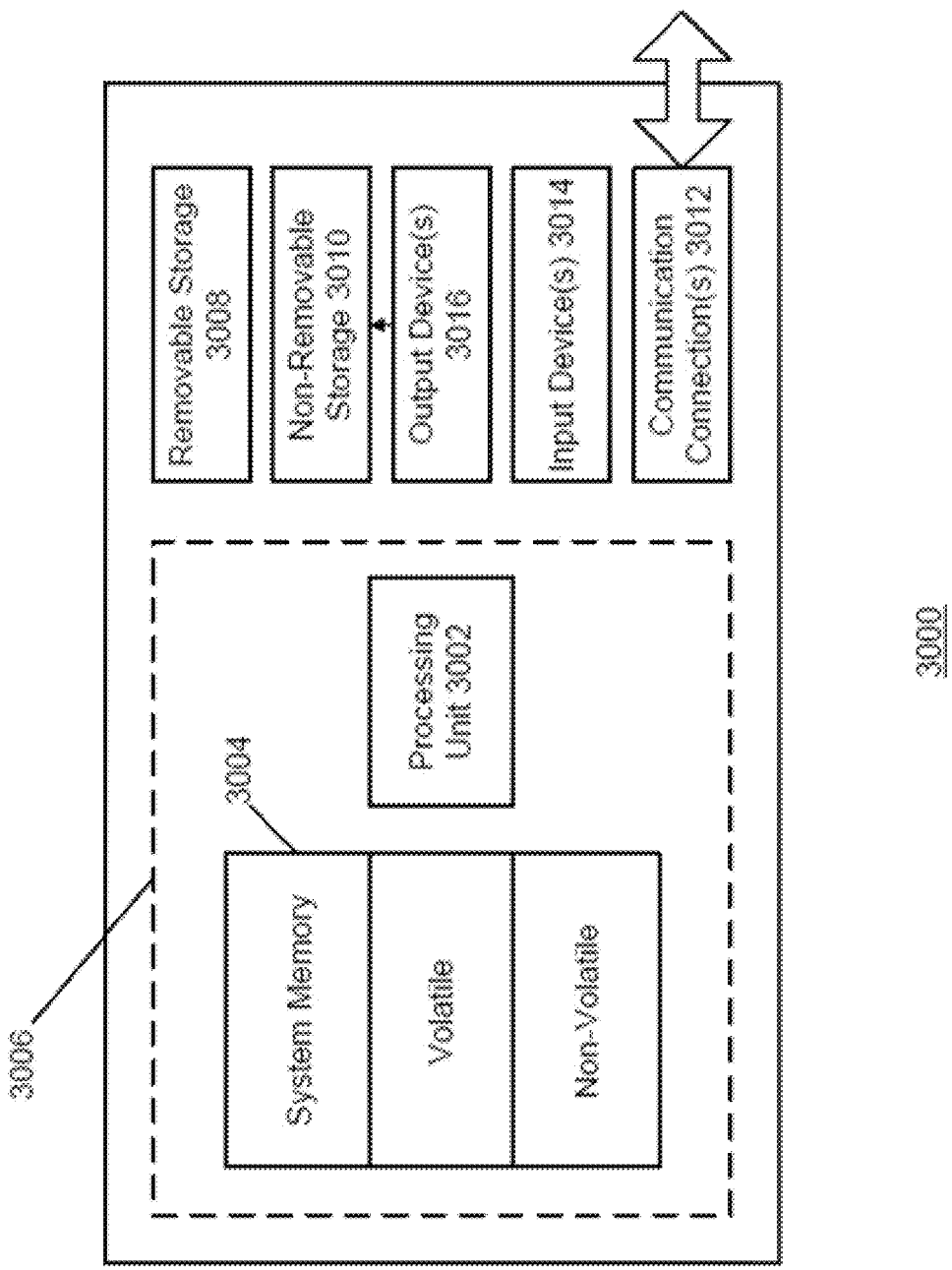
FIG. 19 shows an example computing device that can be configured to execute the exemplary operations described herein.

The base network device 110 and/or remote network device 114 may be provided as a self-contained enclosure having a single board computer, such as shown in FIG. 19. The base network device 110 and/or remote network device 114 may include operating system, such as Linux, that provides a web server 110A for managing access, as described below. The base network device 110 and/or remote network device 114 provides services, such as network discovery 110B, policy synchronization 110C, user identification 110D, a home automation connector 110E, and security scanning and performance monitoring 110F.

In some embodiments, the base network device 110 and/or remote network device 114 have the same hardware and software configurations. The designation of a given network device as a base network device or a remote network device may be via a command to a given device or automatic based on connectivity to the Internet 106 or other wide-area network infrastructure.

The web server 110A may host landing pages for providing partial access of the authorization requesting device to the network to allow an authentication request to be sent to an owner or administrator device, as described below. The landing pages may prompt the user for a name to be displayed to the owner/administrator or a social media username for Facebook). In some embodiments, the land pages may request a photo of the user to be uploaded, e.g., to be presented to the owner/administrator. The request may be relayed to the owner/administrator.

In some embodiments the authorization requesting device is granted bandwidth limited access to a collection of known trusted sites (e.g., google.com, yahoo.com) in the time between when the authentication request is sent and when the owner/administrator has acted on the request.

The network discovery module 110B identifies devices on the network 104 including, but not limited to, a device type and a device owner, such as "ipad, paul", "macbook air, john." For example, Address Resolution Protocol (ARP) may be used to identify the devices 112A, 112B . . . 112N. Protocols such as NetBios, SAMBA, etc. may be used to identify network names. A device scan may be used identify device types.

The policy sync module 1100 synchronizes with the policy database 128 to locally cache policies on the security management device 110.

The device and user identification module 110D may use a device's media access control (MAC) address as a device ID, as the MAC address is unique to each device. For shared devices, an optional user log-in may be used to apply a policy. Information regarding the wireless access point/router 114 may be retrieved using Simple Net work Management Protocol (SNMP). Device and user presence may be tracked.

The home automation connector module 110E provides support to specific systems, such as WINK, AT&T home automation, Xfinity, SmartThings, etc. Other systems may be supported by adding the appropriate logic to the home automation connector module 110E. The home automation connector module 110E provides for a takeover displays action, where input from home automation systems is displayed on all computer and device screens. For example, if a smoke detector alarms, a notification may be provided in a user interface of the devices 112A, 112B . . . 112N, as described below.

A provider infrastructure 120 includes an API server 122, and one or more application se ices, including an application server 124 for installation of the base and remote network devices and an application server 126 for access management and control. The provider infrastructure further includes a device policy database 128. The provider infrastructure 120 may be located anywhere, such as on a public or private cloud, or remote servers. The API server 122 is accessed by an administrator using a device 116 that may be "on" or "off" the home network 104. The API server 122 provides access, for the administrator and/or owner of the home network 104, to configuration profiles of the home network 104.

The application server 124 provides inputs to learn about the home, to calculate placements of the base and remote network devices therein, and to present the information to an owner or administrator of the home network 104 to install the base and remote network devices thereat. In some embodiments, the application server 124 is coupled to, or maintain a database, of real-estate information relating to the construction type of the home, the age of the building, and the size of the building. The application server 124 may retrieved such information from public and private databases and provides the retrieved information to the API server 122, which populates a profile screen on the installation app that is presented to the owner or administrator of the home network 104. In some embodiments, the application server 124 is coupled to the base and/or remote network device to retrieve GPS or MPS coordinates therefrom. The GPS or MPS coordinates may be used to determine an address to which the base and remote network devices are located. The address is then used to retrieve the building type information, as described above. To this end, the information required for placement calculation is pre-populated, making the task quicker and easier for the owner or administrator of the home network 104. In other embodiments, the API server 122 may request the information directly from the owner or administrator of the home network 104.

With reference to FIGS. 2 and 4-8, there is illustrated an example operational flow 200 for customizing installation and placement of wireless access point placement for use on the home network 104 in a building, in accordance with an embodiment, together with associated user interfaces. A mobile app, as shown in FIGS. 4-8 may be provided to install the base and remote network devices, using owner/administrator computing devices, e.g., smartphones, such as IPHONE and ANDROID (and other) devices. The mobile app 202 executing on the owner/administrator computing devices send (step 204) a request to setup the base and remote network devices to a cloud service platform 120 that includes the API server 122 and the installation application server 124. The request includes an identifier (shown as "owner ID") associated with the owner/administrator of the home network 104. At 208, the application server 124 of the cloud service platform 206 determines device identifiers (shown as "access device ID") corresponding to one or more of the base and remote network devices 110 and 114 using the identifier "<owner ID>" in the request. At 210, the application server 124 of the cloud service platform 206 requests GPS or MPS coordinates for the base and remote network devices 110 and 114 using device identifiers "<access device ID>". In response to receiving (step 212) the GPS or MPS data from at least one of the base and remote network devices 110 and 114, the application server 124 of the cloud service platform 120 is configured to determine (step 214) a building address for the base and remote network devices 110 and 114 using the received GPS or MPS data. In some embodiments, the application server 124 of the cloud service platform 120 may use an address lookup API such as Google Maps API. At 216, the application server 124 of the cloud service platform 206 is configured to request building configuration data from public or private databases 218 (such as Realty Trac or Google Maps API). In response to receiving (step 220), the building configuration data, the application server 124 of the cloud service platform 120 may generate (step 222) a configuration page that is pre-populated with the retrieved building configuration data and data associated with the "owner ID" (e.g., a number of associated base and remote network devices associated with the account). The configuration page may be provided to the API server 122, which sends (step 224) the configuration page to the mobile app 202.

At 226, the configuration page is presented on the mobile app 202 and includes retrieved data including the retrieved home address, the retrieved home construction type, the retrieved number of floors, and the retrieved approximate home size. The configuration page prompts (step 226) the owner/administrator to confirm or modify the presented information. The confirmed or updated configuration information is sent (step 228) to the cloud service platform 120 (e.g., the API server 122 and the Application Server 124).

The Application Server 124 may calculate (step 230) a placement map for the installation of the base and remote network devices 110 and 114. In some embodiments, the application server 124 calculates each respective placement based on the size of the home, the number of floors, the number of base and remote network devices 110 and 114, the construction type of the home, and other factors such as WiFi properties (e.g., 5 Ghz or 2.4 Ghz) as well as environment conditions such as number of other Wifi networks and interference in the area. In some embodiments, a lookup table is used for a number of different configurations in the above described factors. In other embodiments, a transfer function is used to determine a floor location and a general placement location for each of the base and remote network devices 110 and 114. The Application Server 124 provides the placement map data for the installation of the base and remote network devices 110 and 114 to the API server 122, which sends (step 232) the placement map to the mobile app 202.

At 234, the mobile app 202 presents the placement map to the owner/administrator of the home network 104.

Figure 2:
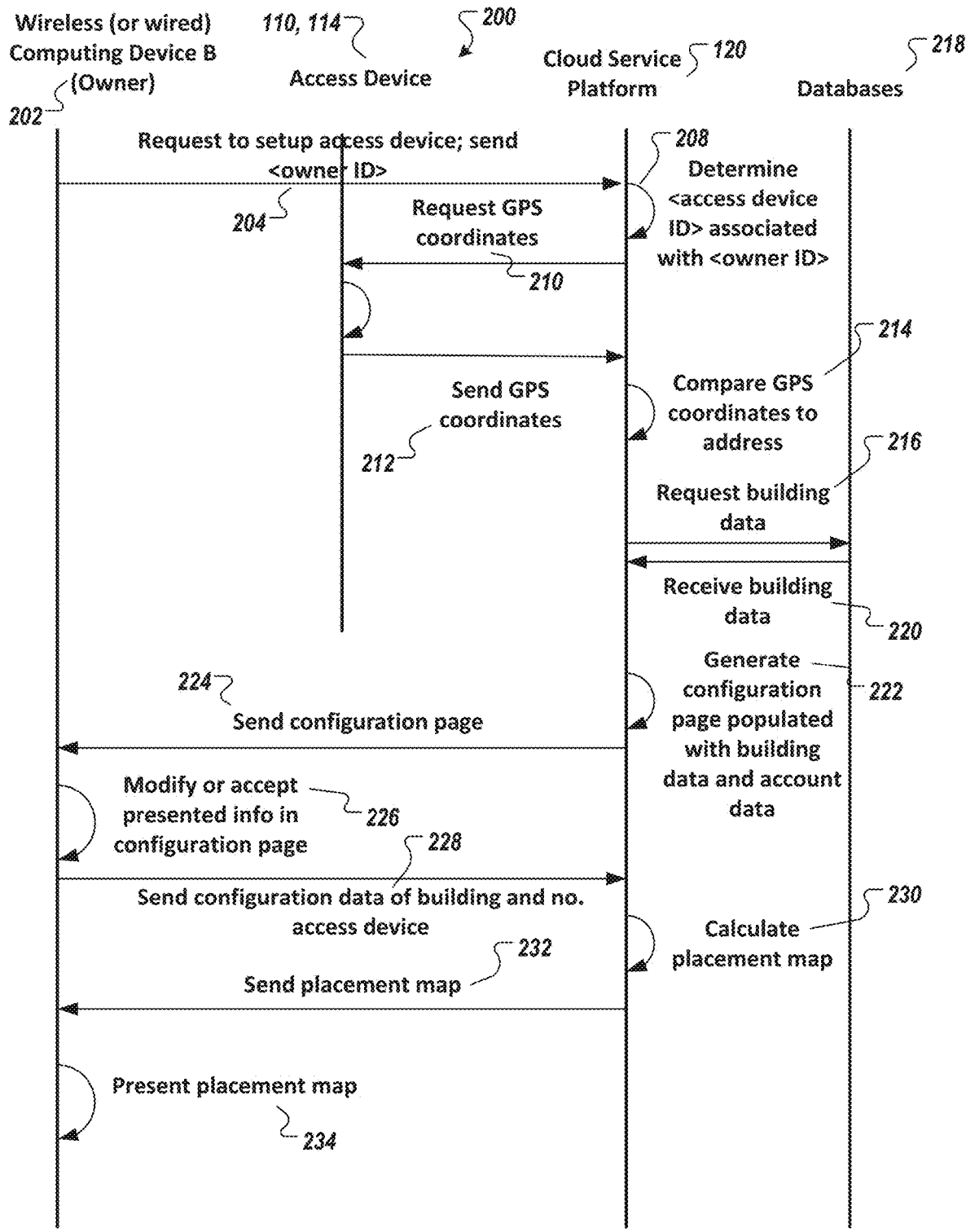
FIG. 2 illustrates an example operational flow for customizing installation and placement of wireless access point placement in a building, in accordance with an embodiment.

Referring now to FIGS. 4-8, there is illustrated example user interfaces associated with the operational flow of FIG. 2, in accordance with an embodiment.

Figure 4:
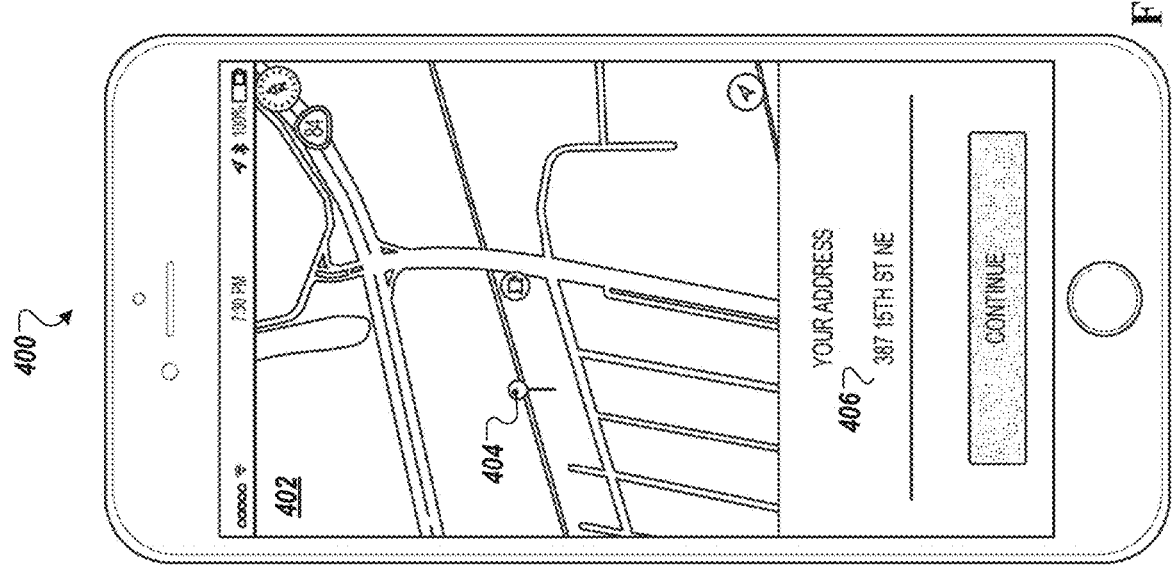

FIG. 4 illustrates a user interface 400 of the mobile app 202 that presents a map location 402 (shown as location 404) of the base and remote network devices 110 and 114, e.g., as retrieved from GPS or MPS coordinates provided by the respective device. The mobile app 202 also presents an editable field 406 pre-populated with an address of the location, which was retrieved, via public or private databases such as Google Map API of RealtyTrac, using the GPS or MPS coordinates. The editable field 406 may be selected to modify the presented home address or to add a new home address.

Figure 5:
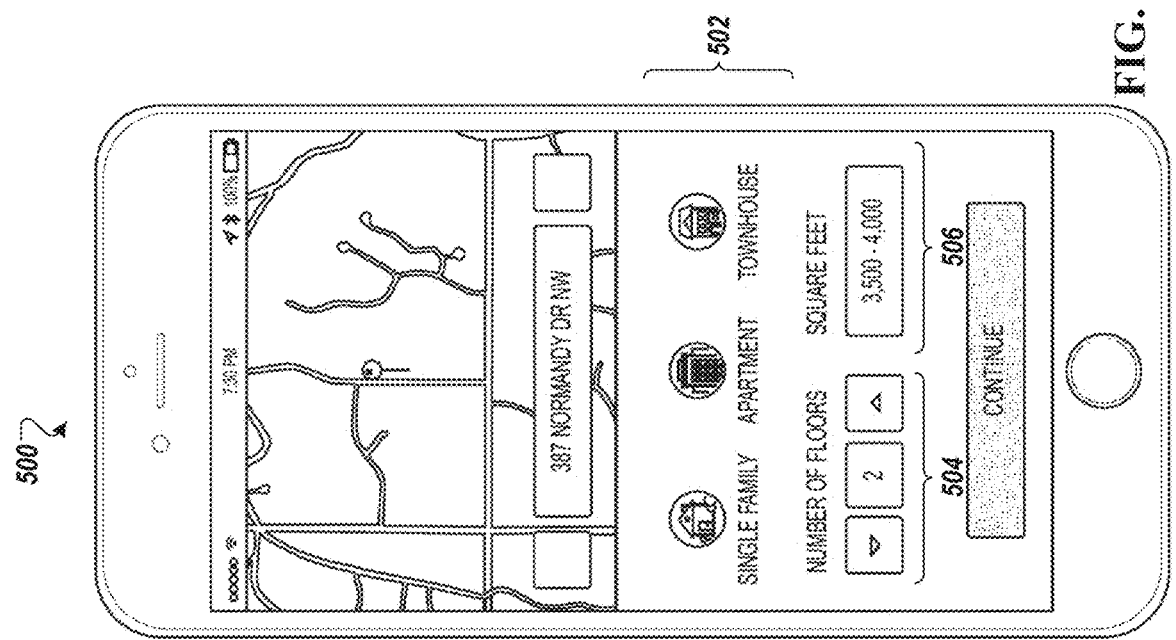
FIGS. 4-8 illustrate example user interfaces associated with the operational flow of FIG. 2, in accordance with an embodiment.

FIG. 5 illustrates a user interface 500 that presents a plurality of editable fields for configuring a home layout. The editable fields include a building construction type field 502, a number of floors field 504, and an approximate size field 506. Each field is pre-populated, in some embodiments, with building construction type data, number of floor data, and approximate build size data, which were retrieved, e.g., via public or private databases such as Google Map API or RealtyTrac, using the GPS or MPS coordinates.

Figures 6, 7, 8:
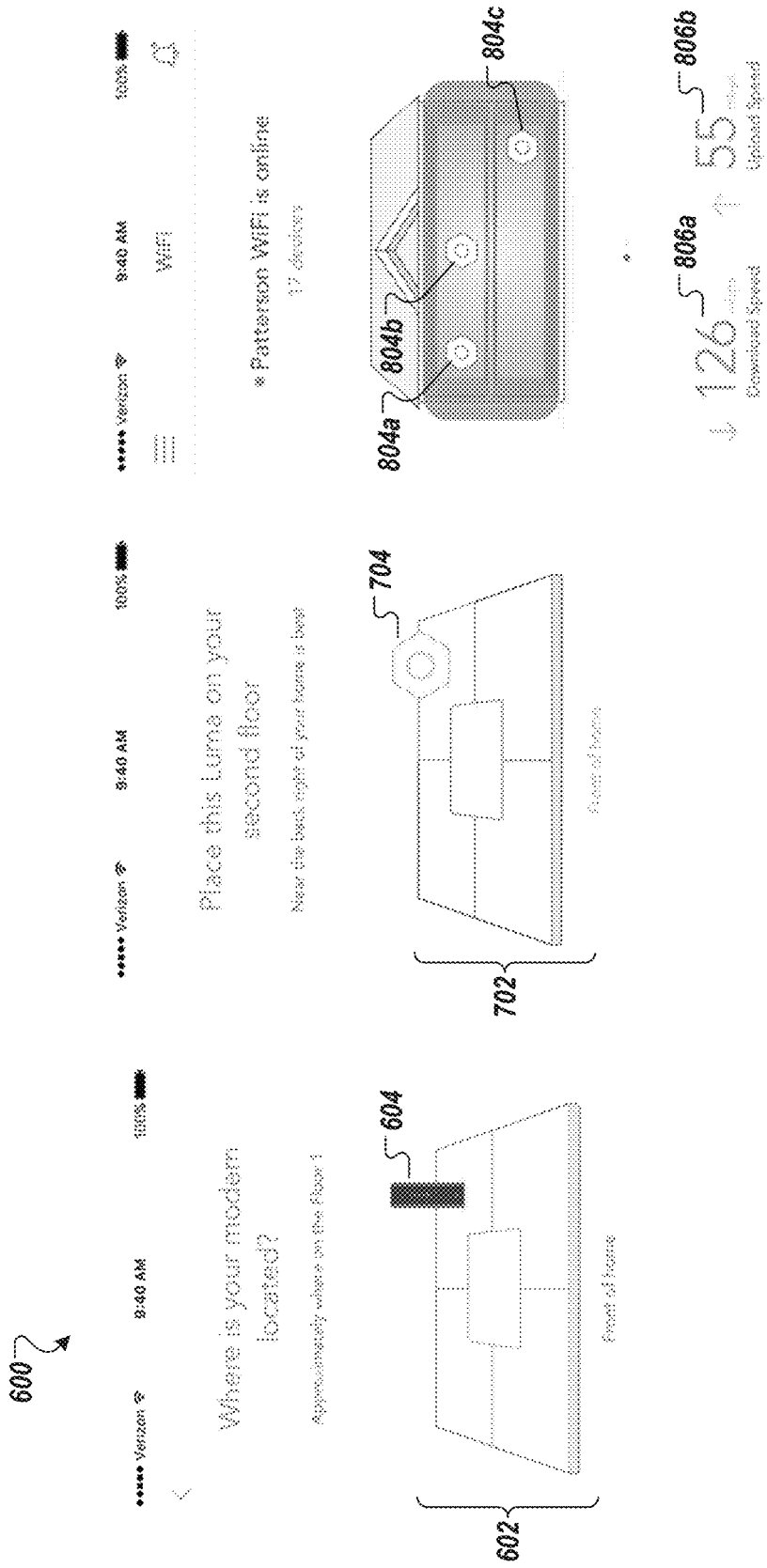

FIG. 6 illustrates a user interface 600 of the mobile app 202 that presents a map location 602 of a location 604 of the high-speed cable modem or router located at the building. The user interface 600 may present the map location 602 as a two-dimensional/three-dimensional simplified diagram of a given floor. The floor location may be selected by sliding the map location widget 602 left/right or up/down to move the map location widget 602 to a desired floor. In some embodiments, other two-dimensional/three-dimensional simplified diagram representation of the given floor may be used, e.g., those derived from home schematics available in public and private databases or those derived from camera images provided, by the user, to the cloud service platform.

FIG. 7 illustrates a user interface 700 of the mobile app 202 that presents a map location 702 of a location 704 for a base or remote access device 110 and 114. In some embodiments, the mobile app 202 presents a map location 702 for each base and remote network device that a placement location has been determined.

FIG. 8 illustrates a user interface 800 of the mobile app 202 that presents a status view 802 of the home network 104. The status view 802 includes a graphical representation (shown as 804a, 804b, and 804c) of the floor location of the base and remote network devices. The status view 802 may further include a graphical representation of network access speeds (e.g., download speeds 806a and upload speeds 806b).

Figure 3:
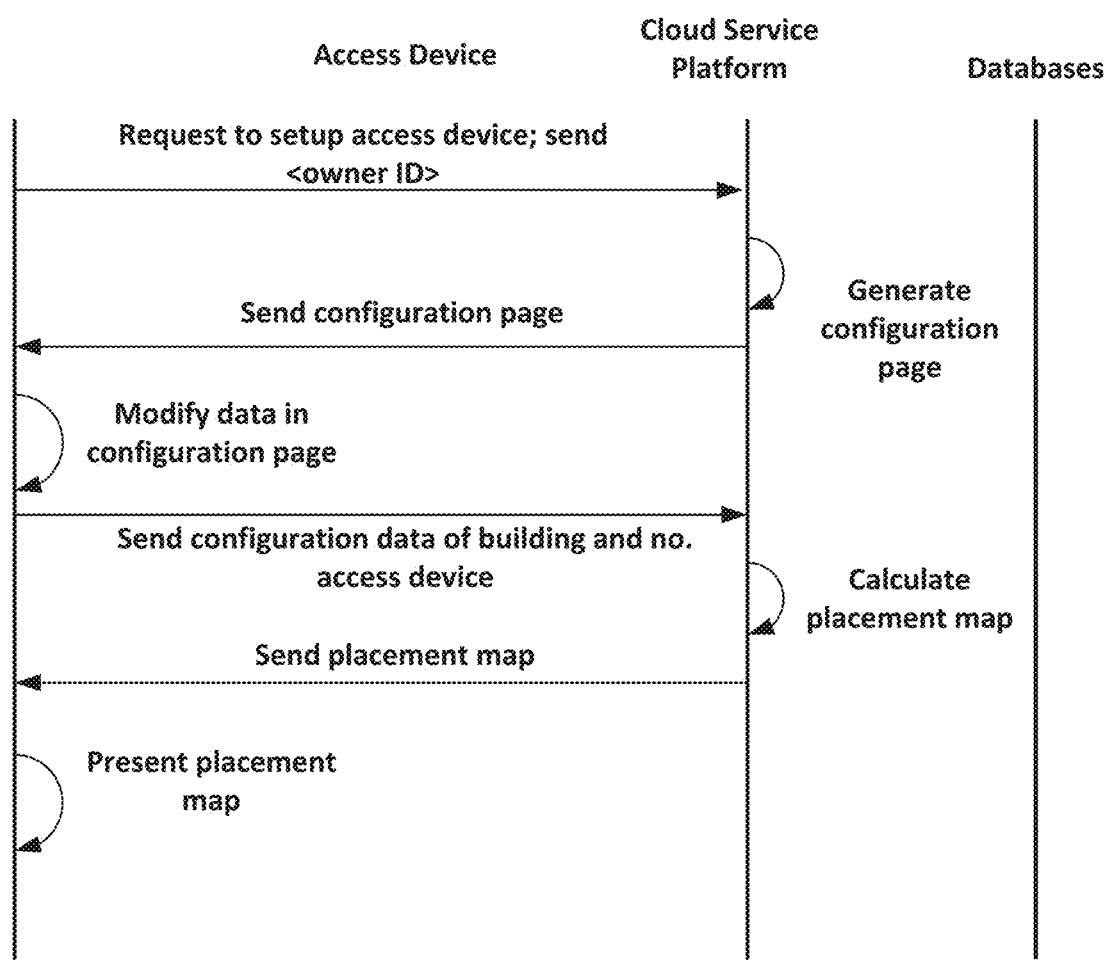
FIG. 3 illustrates another example operational flow for customizing installation and placement of wireless access point placement in a building, in accordance with another embodiment.

Referring back to FIG. 3, there is illustrated another example operational flow for customizing installation and placement of wireless access point placement in a building, in accordance with another embodiment. As shown in FIG. 3, upon a request (step 204) to install the base and remote network devices into a home network being received at the cloud service platform 120 (e.g., API server, the cloud service platform 120 is configured to generate and provide, to the originating mobile app 202, a plurality of configuration pages to prompt, via editable fields, the owner/administrator for building construction type data, a number of floors data, and an approximate size data. The information is used, e.g., by the Application Server, as described above, to calculate placement map of the location of each of the base and remote network devices 110 and 114.

FIGS. 9-10 illustrate example user interfaces associated with the operational flow of FIG. 3, in accordance with an embodiment. In FIG. 9, the mobile app 202 prompts the owner/administrator for a home construction type input 902 and a number of floors input 904. In FIG. 10, the mobile app 202 prompts the owner/administrator for a location of the high-speed cable modem that has been installed or that will be installed in the building.

Access Controlled Guest Network without Password

In another aspect, the exemplified systems and methods simplifies the task of adding personal wireless devices to a network whereby no password is used. Traditional user and guest networks are secured using a WiFi password. This password must be remembered by the homeowner and then shared with other users or visitors. If no password is used, then the network is open and vulnerable.

Using the exemplified methods and systems, a visitor (or user) does not immediately have access to the Internet, whereby the visitor, or user, is added to home network in a restricted manner). Instead they are presented with a captive portal page that asks for their name in order to send a permission request to the network owner. The network owner receives an alert in an app which allows the network owner to allow or deny the request for access to the guest network (or home network). If allowed, the visitor is granted access, in some embodiments, for a period of time as determined by the network owner. The time period could be one hour, one day, indefinite or any other period. If denied, the visitor is notified with a message in their browser.

Figure 11:
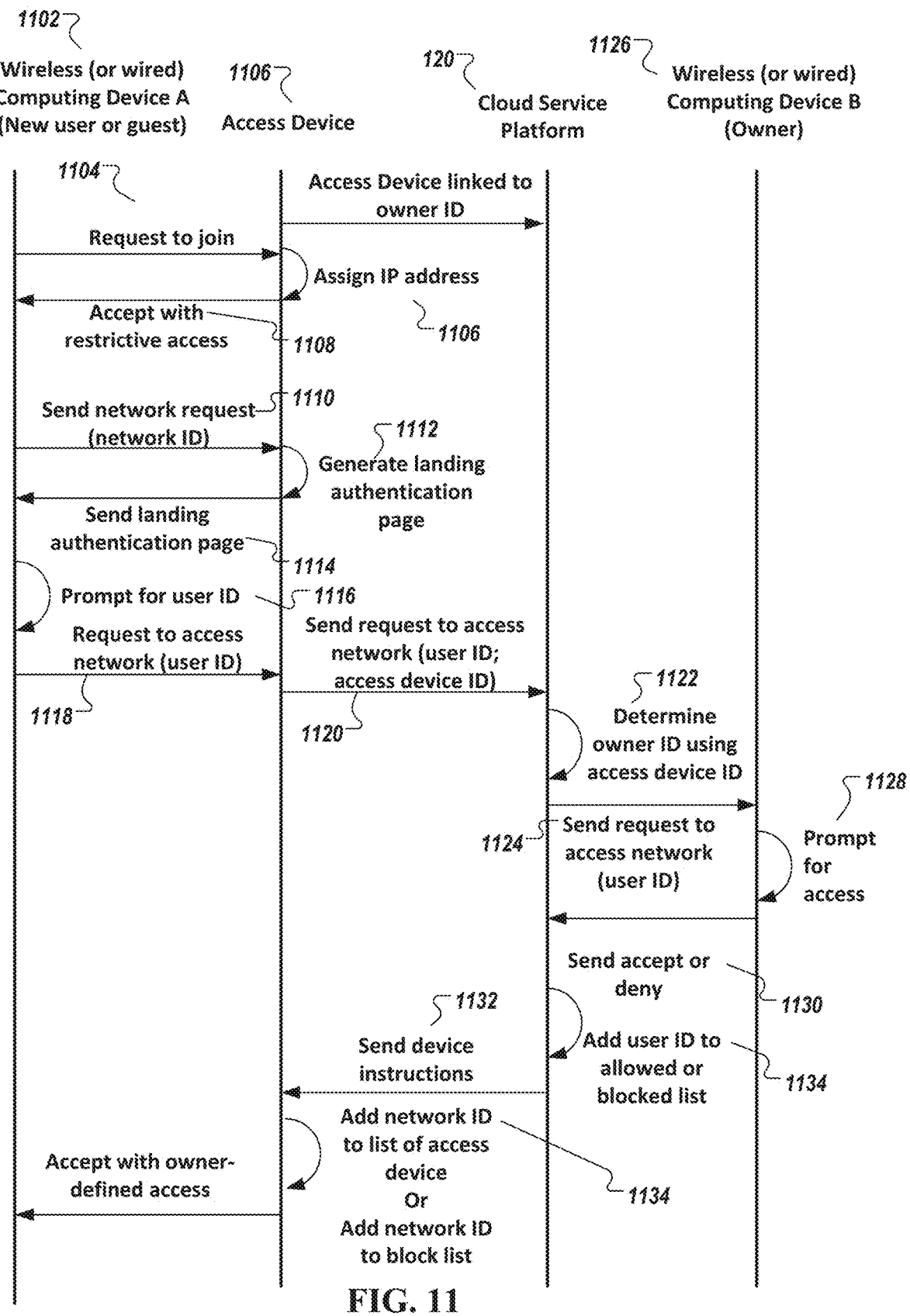
FIG. 11 illustrates an example operational flow for managing (e.g., via cloud service platform) a network access point device to add a computing device to a secured network without using a password, in accordance with an embodiment.

FIG. 11 illustrates an example operational flow for managing (e.g., via cloud service platform) a network access point device to add a computing device to a secured network without using a password, in accordance with an embodiment.

As shown in FIG. 11, upon receiving (step 1104), at an access device 1106 (e.g., the base or remote network devices 110 and 114) a request from a wireless (or wired) computing device 1102 that is new to the home network 104, the access device 1106 is configured to assign (1106) the unauthenticated wireless computing device 1102 an IP address and to add the MAC address of the unauthenticated wireless computing device 1102 to a list of devices with limited access to the home network 104. In some embodiments, devices in the list of devices have permission to indirectly communicate with the cloud service platform 120. That is, the unauthenticated wireless computing device 1102 has an assigned IP address, but is not provided access to any network resources including access to other computing devices in the home network 104 or to the World Wide Web (WWW). The access device 1106 sends (step 1108) a reply to the request to the unauthenticated wireless computing device 1102.

At a mobile app or browser application executing on the unauthenticated wireless computing device 1102, the unauthenticated wireless computing device 1102 sends (step 1110) a network request to the access device to access content on the WWW or the Internet. Upon a receiving the network request (e.g., HTTP-based request, HTTPS based request, SNMP request, TCP/IP based request, and the like), the access device 1106 is configured to generate (step 1112) a landing authentication page (e.g., via a web server 110A) and send (step 1114) the landing authentication page to the unauthenticated wireless computing device 1102. The authentication page prompts (step 1116), in some embodiments, the user of the unauthenticated wireless computing device 1102 for a name to be presented to the owner/administrator of the home network 104. In response receiving the name identifier for the user, the authentication page sends (step 1118) an authentication request for access to the home network 104 to the access device 1106. The authentication request, in some embodiments, includes the provided name. The access device 1106, in some embodiments, relays (step 1120) the authentication request to the cloud service platform 120 (e.g., to an Application Server 126 for managing access control). The relayed authentication request may include the provided name data and, additionally, an identifier (shown as "<access device ID>") associated with the access device 1106. The Application Server 126 of the cloud service platform 120 may determine (step 1122) an owner identifier for the access point 1106 using the provided identifier ("<access device ID>") and send (step 1124) an authentication request to an owner computing device 1126 associated with the determined owner identifier. A mobile app 202 executing on the computing device 1126 may generate an alert or notification of the request and prompts (step 1128) the owner/administrator to grant or deny access of the request. Upon receiving a selection by the owner/administrator, the owner computing device 1126 sends (step 1130) a reply to the cloud service platform 120 (e.g., to the Application Server 124 or the API server 122), and the cloud service platform 120 sends (step 1132) the reply to the access device 1106. In some embodiments, the cloud service platform 120 adds (step 1134) the transmitted name identifiers of the user and/or the MAC ID associated with the user computing device 1102 to a grant, or blocked, list depending on the selection. In some embodiments, there are several grant list each configurable by the owner/administrator to provide different level of access to different types of network resources. In some embodiments, the grant list has an associated expiration tune.

At 1134, the access device 1106 removes the MAC ID associated with the user computing device 1102 from the "limited access" list and adds the MAC ID to a respective allowed, or blocked, list. The access device 1106 sends (step 1136) an allowed or deny notification to the wireless computing device 1102.

FIGS. 13, 14, 15, and 16 illustrate example user interfaces associated with the operational flow of FIG. 11, in accordance with an embodiment.

Figure 13:
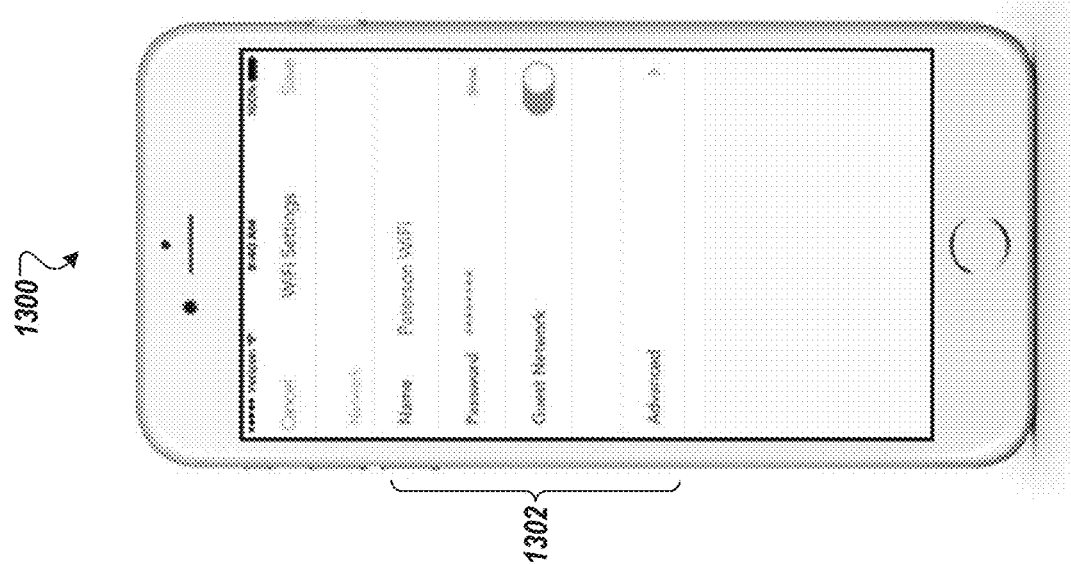

FIG. 13 illustrates a user interface 1300 of the mobile app 1102 that presents a WiFi authentication screen 1302 to add a network device to the home network 104 as a guest device.

Figure 14:
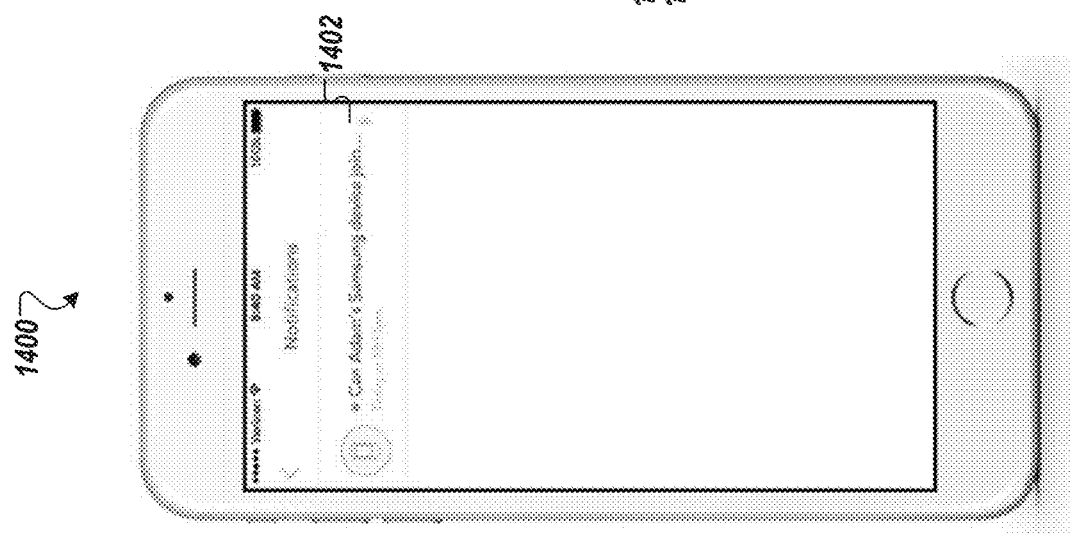

FIG. 14 illustrates a user interface 1400 of the mobile app running on the owner computing device 1126 that presents an alert of notification 1402 of a request of a guest to join the home network 104.

Figure 15:
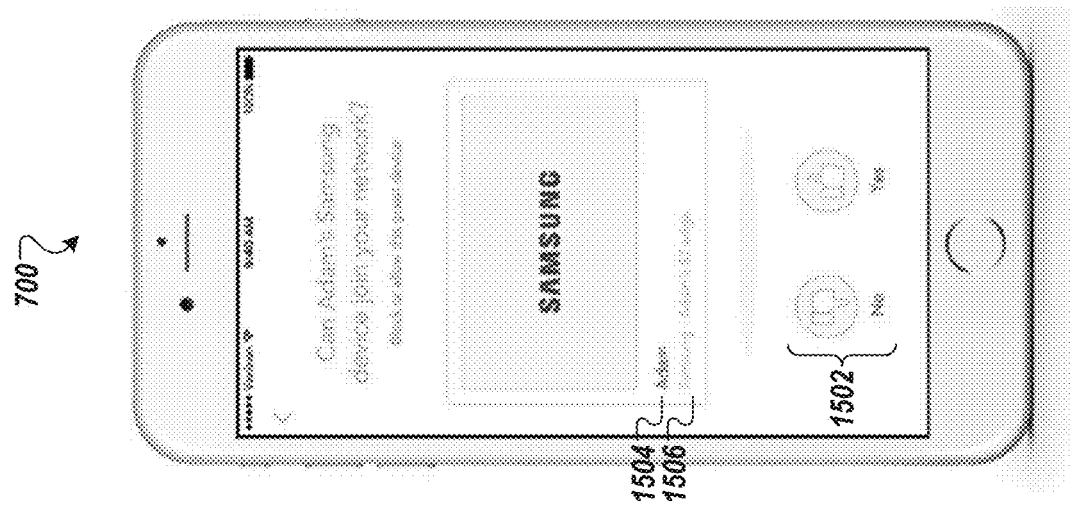
FIGS. 13, 14, 15, and 16 illustrate example user interfaces associated with the operational flow of FIG. 11, in accordance with an embodiment.
Figure 16:
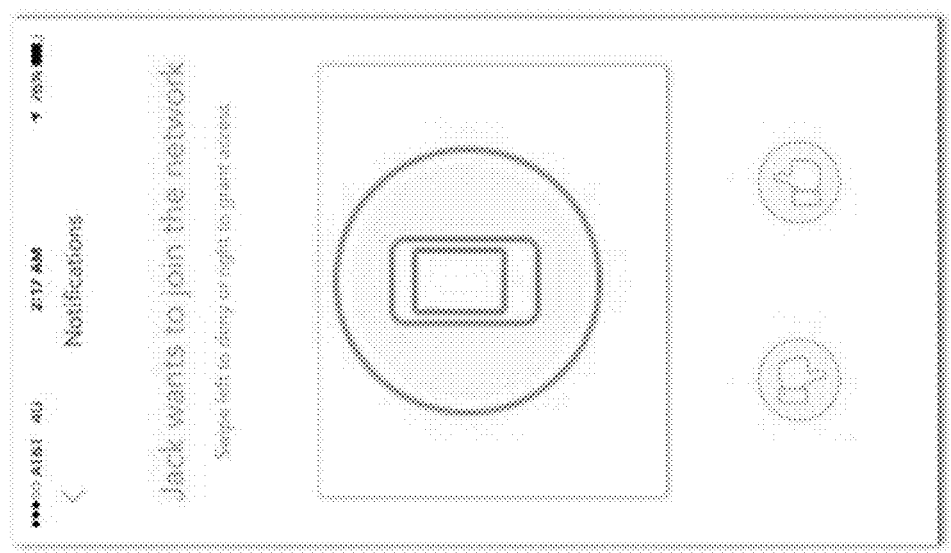

FIG. 15 illustrates a user interface 1500 of the mobile app running on the owner computing device 1126 that presents a graphical input 1502 prompting the owner/administrator to allow a network device to join the home network 104. The user interface 1500 may include a name 1504 of the user as provided by the user, for example, as described in relation to FIG. 11. The user interface 1500 may include a description 1506 of the computing device (e.g., a make and model). The graphical input 1502 be presented as a "yes" and "no" button (or a "allow" and "deny" button). FIG. 16 illustrates an alternative user interface 100 of the mobile app. of FIG. 15.

Figure 12:
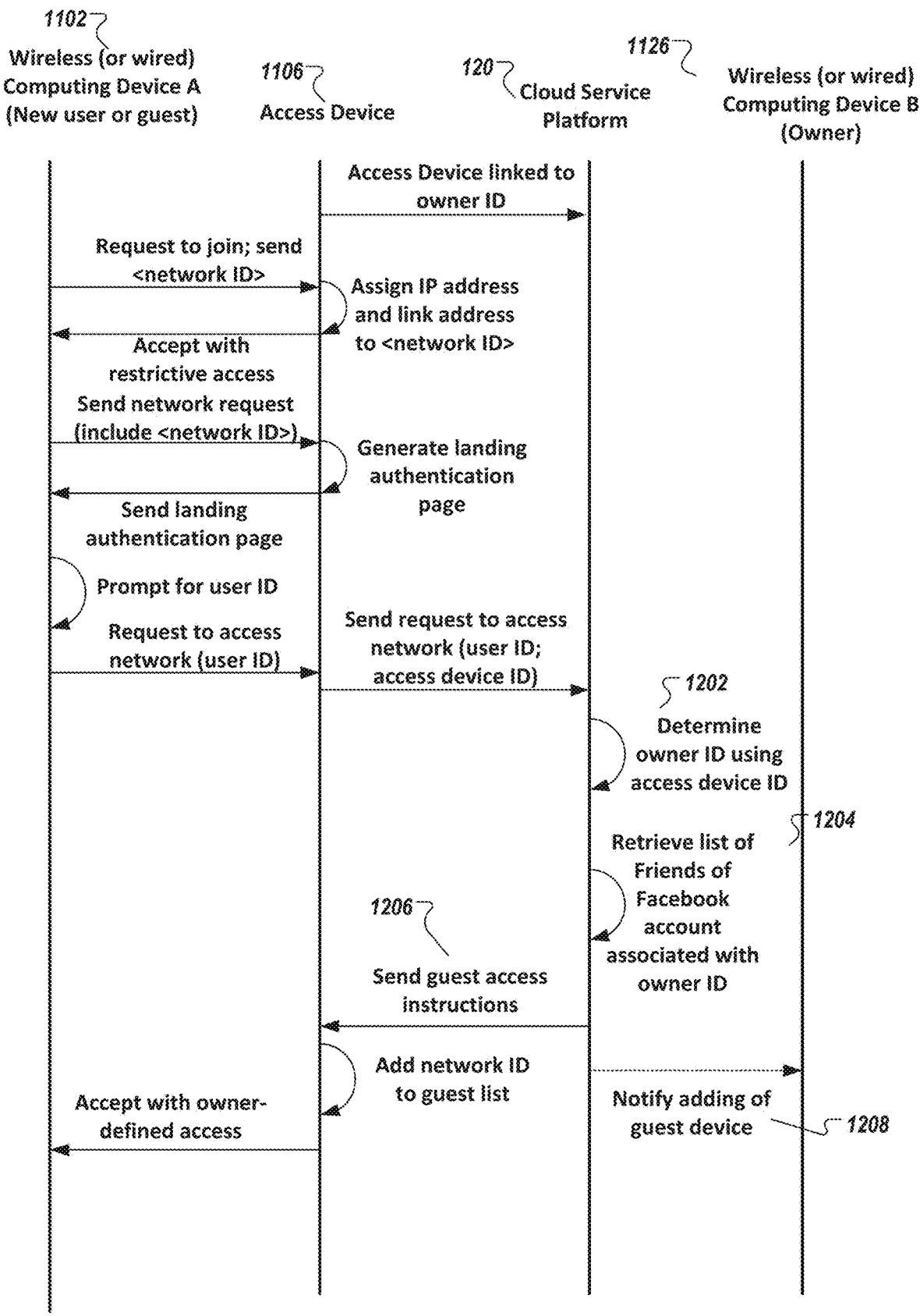
FIG. 12 illustrates another example operational flow for managing (e.g., via cloud service platform) a network access point device to add a computing device to a secured network using social network information, in accordance with another embodiment.

Referring now to FIG. 12, there is illustrated another example operational flow for managing (e.g., via cloud service platform) a network access point device to add a computing device to a secured network using social network information. Rather than, or prior to, sending a request to the owner/administrator computing device to allow access of the user computing device 1102 (e.g., guest device) to the home network or to block the user computing device 1102, the cloud service platform is configured to detent e (step 1202 and 1204) a social network identifier (e.g., Facebook username) for the guest user and for the owner/administrator of the home network 104. Upon determining a match of the retrieved social network identifier (e.g., Facebook user ID) being present in the retrieved list (e.g., Facebook friend list) of associated social network identifier associated with the owner of the network, the cloud service platform 120 may instruct (step 1206) the access device 1106 to add the user computing device 1102 to a list of guest devices. In some embodiments, the cloud service platform 120 sends (step 1208) a notification to the owner/administrator, via their respective computing device, of the user computing device 1102 being added to the home network 104 as a guest device. The access point 1106 sends (step 1208) a notification to the user computing device 1102 that guest access has been granted.

Auto-Join Network

Figure 17A:
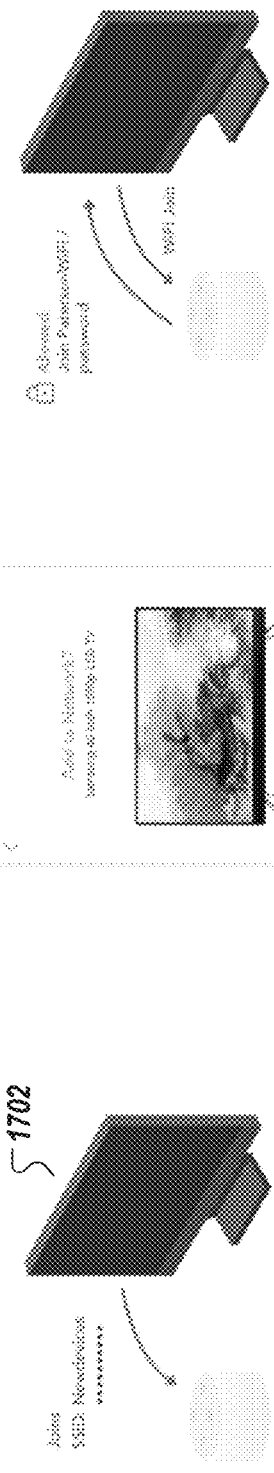
FIGS. 17A, 17B, and 17C illustrate an example method of managing a network access point device to add a computing device to a secured network without using a password, in accordance with another embodiment.
Figure 17B:
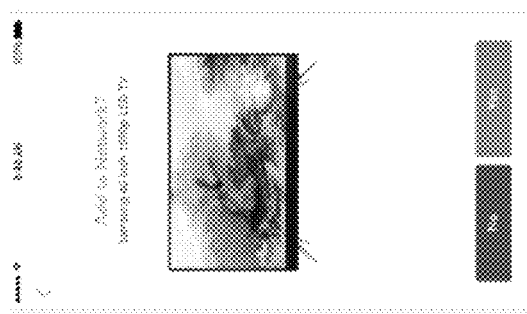
Figure 17C:
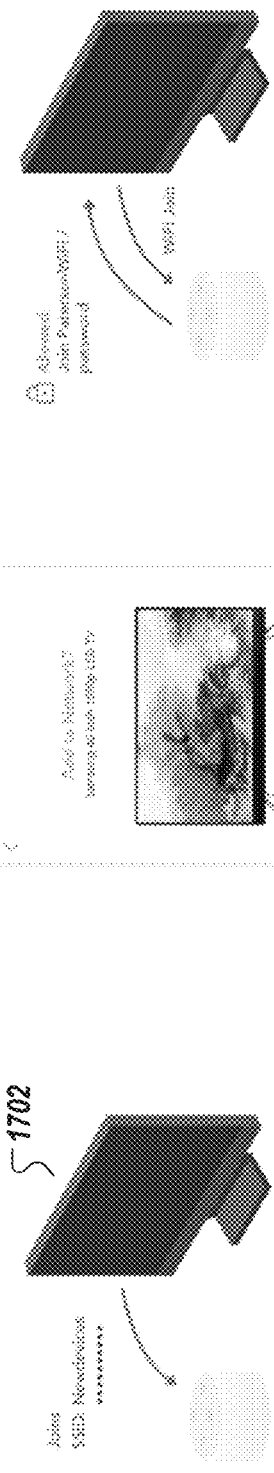

FIGS. 17A, 17B, and 17C illustrate an example method of managing a network access point device to add a computing device to a secured network without using a password, in accordance with another embodiment. As shown in FIG. 17A, the method 1700 facilitate joining of a new device

1702 to a network by requesting to join an auto-join SSID broadcasted by an access device (e.g., 110, 114). In some embodiments, the new device 1702 is configured to search for the auto-join SSID during boot-up of the new device 1702. In some embodiments, the auto-join SSID is a known SSID that is broadcasted by an auto-join compliant access point.

Upon the new device 1702 joining the network, the new device 1702 transmits, via a client, a network request to an API endpoint executing on the access device. The client, in some embodiments, is configured to transmit identification information (such as device name, firmware version, capabilities, and like information associated with the device) a cryptographic key (e.g., a public cryptographic key) to a provider infrastructure 120 (e.g., in the cloud) by way of the access point (e.g., 110 or 114). In some embodiments, the identification information, or a portion thereof, presented to the owner/administrator of the home network 104 to prompt the owner/administrator to accept or to decline network access to the network 104 (see FIG. 17B).

In some embodiments, upon a decline prompt being received from the owner/administrator (via their device), the provider infrastructure 120 is configured to notify (i.e., prohibit) the access point (e.g., 110, 114) and all connecting device to deny access to any network resource to the new device 1702. In some embodiments, the access point (e.g., 110, 114) is configured to prohibit new device 1702 from accessing the auto-join SSID network.

In some embodiments, upon an acceptance prompt being received from the owner/administrator (via their device), the provider infrastructure 120 is configured to notify the access point (e.g., 110, 114) that the new device 1702 is authorized to access the network (see FIG. 17C). In some embodiments, the access point (e.g., 110, 114) transmits an acceptance message to the new device 1702. In some embodiments, the acceptance message includes a data payload encrypted with the cryptographic key (e.g., a public cryptographic key) associated with the new device 1702. In some embodiments, the new device 1702 uses the cryptographic key to decrypt the payload, which includes information (e.g., SSID, passphrase) required to join the network 104. The auto-join feature simplify the process of connecting a smart device (e.g., connected televisions, lightbulbs, other IoT devices) to a network.

Figure 18:
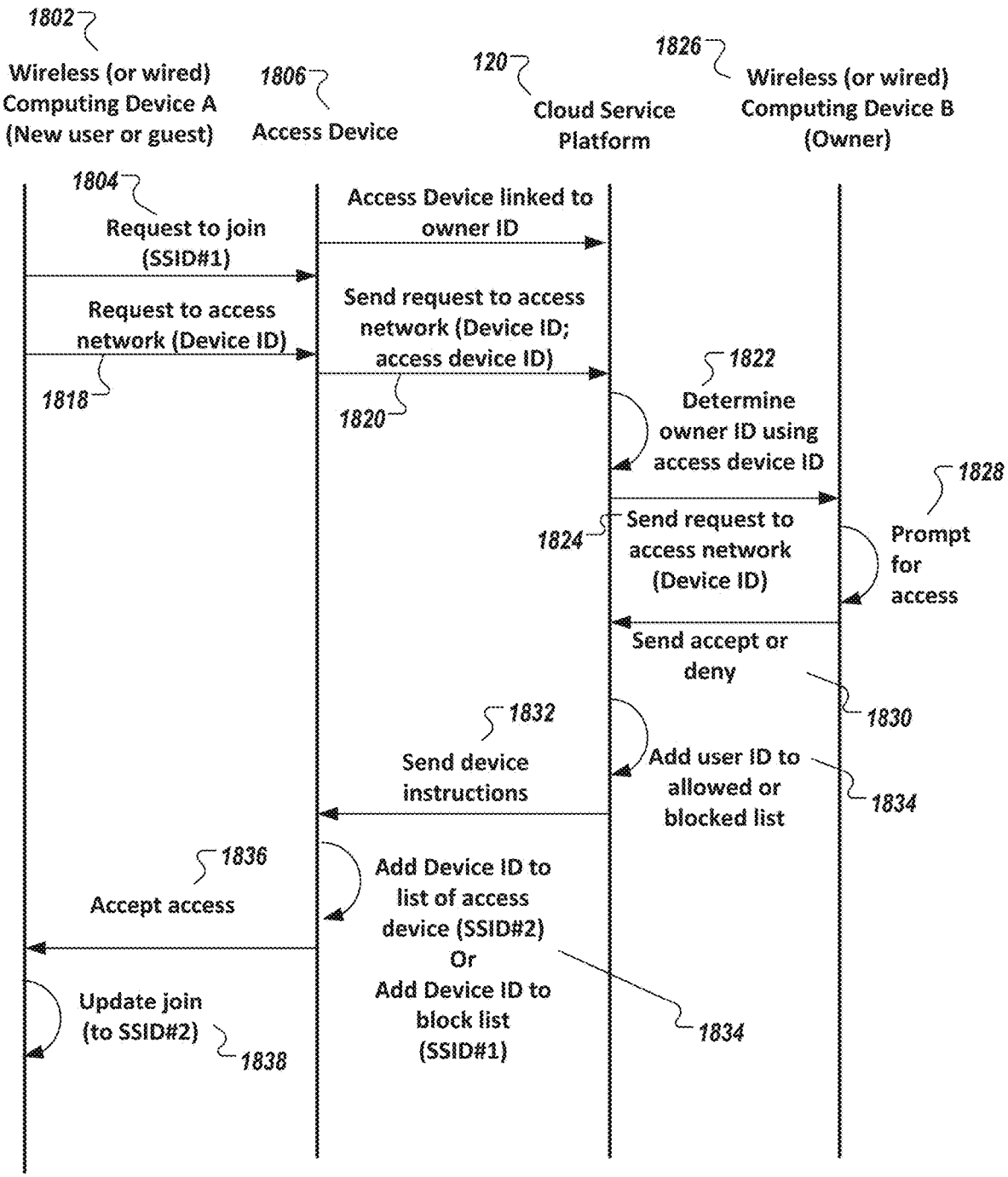
FIG. 18 illustrates an example operational flow of FIGS. 17A-17C for managing a network access point device to add a computing device to a secured network without using a password, in accordance with an embodiment.

FIG. 18 illustrates an example operational flow of FIGS. 17A-17C for managing a network access point device to add a computing device to a secured network without using a password, in accordance with an embodiment.

As shown in FIG. 18, upon boot up, a new device 1802 (e.g., a client executing thereon) searches for an auto-join SSID associated with a first network and broadcasted by an access device 1806 (e.g., the base or remote network devices 110 and 114) to the first work. The new device 1802 transmits a request 1804 to join the auto-join SSID (shown as "SSID #1"). In some embodiments, the new device 1802 is configured to then transmit a request 1818 to access the network 104 (i.e., a second network) to the access device 1806. In some embodiments, the request 1818 includes device identification information such as device name, firmware version, capabilities, and like information associated with the new device 1802. In some embodiments, the request 1818 includes a cryptographic key (e.g., a public cryptographic key) associated with the new device 1802.

In some embodiments, in response to receiving the request 1804, the access device 1806 is configured to assign the new device 1804 an IP address and to add the MAC address of the new device 1802 to a list of devices with limited access the first network. In some embodiments, the access device 1806 is configured to assign the new device 1804 an IP address and to add the MAC address of the new device 1802 to a list of devices with limited access the second network (i.e., the network 104). In some embodiments, devices in the list of devices have permission to indirectly communicate with the cloud service platform 120. That is, the new device 1802 has an assigned IP address, but is not provided access to any network resources including access to other computing devices in the home network 104 or to the World Wide Web (WWW). In some embodiments, the access device 1806 sends a reply to the request to the new device 1802 in response to the request 1804.

Referring still to FIG. 18, in response to receiving the request 1818 to access the network 104 from the new device 1802, the access device 1806, in some embodiments, is configured to relay an authentication request 1820 to the cloud service platform 120 (e.g., to an Application Server 126 for managing access control). The relayed authentication request 1820, in some embodiments, include the device identification information (or a portion thereof) (shown as "Device ID") and, additionally, an identifier (shown as "<access device ED-=") associated with the access device 1806. The Application Server 126 of the cloud service platform 120 may determine (step 1822) an owner identifier for the access point 1806 using the provided identifier ("<access device ID>") and send (step 1824) an authentication request to an owner computing device 1826 associated with the device identification information (Device ID). A mobile app 202 executing on the computing device 1826 may generate an alert or notification of the request and prompts (step 1828) the owner/administrator to grant or deny access of the request. Upon receiving a selection by the owner/administrator, the owner computing device 1826 sends (step 1830) a reply to the cloud service platform 120 (e.g., to the Application Server 124 or the API server 122), and the cloud service platform 120 sends (step 1832) the reply to the access device 1806. In some embodiments, the cloud service platform 120 adds (step 1834) the transmitted device identification information (or a portion thereof) and/or the MAC ID associated with the new device 1802 to a grant, or blocked, list depending on the selection. In some embodiments, there are several grant list each configurable by the owner/administrator to provide different level of access to different types of network resources. In some embodiments, the grant list has an associated expiration time.

At 1834, the access device 1806 removes the MAC ID associated with the new device 1802 from the "limited access" list associated with the first network and adds the MAC ID to a respective allowed list (associated with the network 104), or a blocked list (associated with the first network). The access device 1106 sends (step 1836) an allowed or deny notification to the new device 1802.

Referring still to FIG. 18, the access point 1806 transmit an acceptance message 1836 to the new device 1802. The acceptance message 1836, in some embodiments, includes a data payload encrypted with the cryptographic key (e.g., a public cryptographic key) associated with the new device 1802. In some embodiments, the new device 1802 uses the cryptographic key to decrypt the payload, which includes information (e.g., SSID, passphrase) required to join the network 104 (here, associated with a second SSID (shown as "SSID #2")).

Example Computing Environment

FIG. 19 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 19, an exemplary system for implementing aspects described herein includes a computing device (e.g., mobile computing device), such as computing device 3000. In its most basic configuration, computing device 3000 typically includes at least one processing unit 3002 and memory 3004. Depending on the exact configuration and type of computing device, memory 3004 may be volatile (such as random access memory (RAM)), non-volatile (such as read-only memory (ROM), flash memory, etc.), or some combination of the two. This most basic configuration is illustrated in FIG. 19 by dashed line 3006.

Computing device 3000 may have additional features/functionality. For example, computing device 3000 may include additional storage (removable and/or non-removable) including, but not limited to, magnetic or optical disks or tape. Such additional storage is illustrated in FIG. 19 by removable storage 3008 and non-removable storage 3010.

Computing device 3000 typically includes a variety of tangible computer readable media. Computer readable media can be any available tangible media that can be accessed by device 3000 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 3004, removable storage 3008, and non-removable storage 3010 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 3000. Any such computer storage media may be part of computing device 3000.

Computing device 3000 may contain communications connection(s) 3012 that allow the device to communicate with other devices. Computing device 3000 may also have input device(s) 3014 such as a keyboard, mouse, pen, voice input device, touch input device, etc. Output device(s) 3016 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the si subject matter defined in the appended claims is not necessarily limited to the specific features or acts described above. Rather, the specific features and acts described above are disclosed as example forms of implementing the claims.

What is claimed is:

1. A system configured for customizing installation and placement of wireless access point placement in a building, the system comprising:
   a network gateway;
   a processor; and
   a memory having instructions stored thereon, wherein execution of the instructions by the processor, cause the processor to:
   transmit, to one or more first computing devices, a request to configure and install a plurality of wireless access point devices in a building, the plurality of wireless access point devices comprising a first wireless access point and a second wireless access point; and
   receive, from the one or more first computing devices, an acknowledge of the request,
   wherein the one or more first computing devices are configured to access a location identifier associated with the first wireless access point, a building address associated with the location identifier, and a building layout data associated with the building address, and wherein the one or more first computing devices are configured to determine a first location for the first wireless access point and a second location or the second wireless access point based on the accessed data; and wherein the first location and second location are presented, at a graphical user interface of a user device, a graphical representation of a map of the building, wherein the first location and second location each denotes a floor location and an area location on each respective floor location.

2. The system of claim 1, wherein the request is transmitted based on a prior request sent from the user device.

3. The system of claim 1, wherein the system is a wireless access point (WAP) device.

4. The system of claim 1, wherein the map of the building comprises a representation of a floor plan of the building.

5. The system of claim 1, wherein the network gateway, processor; and memory are located on a single board computer.

6. The system of claim 1, wherein the system is a home automation device.

7. The system of claim 1, wherein the map of the building comprises a diagram of a floor plan, the diagram comprising a plurality of areas, the plurality of areas having a number of areas selected from the group consisting of 1, 2, 3, 4, 5, 6, 7, 8, 9, 10, 11, 12, 13, 14, 15, 16, 17, 18, 19, and 20.

8. The system of claim 1, wherein the first location and second location are determined by a transfer function that includes variables including a size of the building; a number of floors; a number of access points; a construction type of the building; and an access point type.

9. The system of claim 1, wherein the building layout data comprises a building type selected from the group consisting of a single-family home, an apartment, and a townhouse.

10. The system of claim 1, wherein the building layout data comprises a number of floors and a number of home size.

11. A system to manage a secured network, the system comprising:
   a network gateway;
   a processor; and
   a memory having instructions stored thereon, wherein execution of the instructions by the processor, cause the processor to:
   receive, from a user computing device, a broadcasted request to join the user computing device to a network, wherein the broadcasted request comprises a device identifier and a physical address associated with the second computing device;
   add the device identifier associated with the user computing device to a list of restrictive devices, wherein the list of restrictive devices is used to grant the user computing device partial access to communicate with the network gateway;
   transmit, to the user computing device, an authentication file, wherein the authentication file has instructions that, when is parsed or executed by the user computing device, cause the user computing device to present, at a display associated with the user computing device, a prompt for a user identity identifier;
   receive the user identity identifier from the user computing device;
   transfer the user identity identifier to a cloud service platform, wherein the cloud service platform is configured to cause the user identity identifier to be presented, at a display, of a computing device associated with an owner of the network and to be prompted for a selection to provide access of the second computing device to the network;
   receive a command from the cloud service platform, wherein the command is associated with granted access of the user computing device; and
   add the physical address associated with the user computing device to a list of accessed devices that allows the device listed therein to communicate via an open Internet port associated with the network.

12. The system of claim 11, wherein the system is a wireless access point (WAP) device.

13. The system of claim 11, wherein the list of accessed devices is a guest list.

14. The system of claim 11, wherein the list of accessed devices is a user list.

15. The system of claim 11, comprising: receiving, at the first computing device, a second command to remove the physical address associated with the second computing device from the list of accessed devices, the second command being sent in response to an expiration of a access time allowance.

16. The system of claim 11, wherein the list of accessed devices is one of plurality of lists each having an associated set of one or more network devices.

17. The system of claim 11, wherein cloud service platform is configured to i) retrieve a social network identifier corresponding to the user identity identifier ii) retrieve a list of associated social network identifier associated with the owner of the network and iii) transmit the command associated with the granted access of the second computing device to the first computing device upon a match of the retrieved social network identifier being present in the retrieved list of associated social network identifier associated with the owner of the network,
   wherein the command associated with the granted access is transmitted automatically without any input from the owner of the network, and wherein the owner of the network is prompted for the command associated with the granted access.

18. A non-transitory computer readable medium for managing a network access point device to add a computing device to a secured network without using a password, the computer readable medium comprising instructed stored thereon, wherein execution of the instructions by a processor of a computing device, cause the processor to:
   in response to receiving, from a first computing device, a first request to add a user computing device to a network associated with the first computing device, transmit a second request to a third computing device associated with an owner of the network, wherein the second request causes the third computing device to present, in a graphical user interface, a prompt comprising a widget to accept or deny access of the user computing device to the network, wherein the user computing device is listed in a list of restrictive devices that allows the device listed therein to communicate with the one or more second computing devices through the network;
   in response to receiving an accept message from the third computing device, transmit the accept message to the first computing device, wherein the accept message causes the first computing device to add the user computing device to i) a first list of user devices that allows the device listed therein to communicate via an open Internet port associated with the first computing device and/or ii) a second list of users devices that allows the devices listed therein to communicate with the one or more computing devices and/or resources associated with the network; and in response to receiving a deny message from the third computing device, transmit the deny message to the first computing device, wherein the deny message causes the first computing device to add the user computing device to i) a third list of user devices that prohibit the device listed therein from communicating via the open Internet port or with the one or more computing devices and/or resources associated with the network.

19. The computer readable medium of claim 18, wherein the first request comprises a user identity identifier associated with the user computing device, the instructions when executed by the processor further cause the processor to:
   in response to the first request, i) retrieve one or more social media identifier corresponding to the user identity identifier and ii) retrieve a list of associated social network identifier associated with the owner of the network; and
   transmit the command associated with the granted access to the first computing device upon a match of the retrieved social network identifier being present in the retrieved list of associated social network identifier associated with the owner of the network.

20. The system of claim 18, wherein the first request comprises a name identifier.

\* \* \* \* \*